March 29, 1949.  L. W. GRAVES  2,465,644
BATTERY CASE
Filed Oct. 25, 1944

INVENTOR.
Lyman W. Graves
BY Victor J. Evans & Co.
ATTORNEYS

Patented Mar. 29, 1949

2,465,644

UNITED STATES PATENT OFFICE 2,465,644

BATTERY CASE

Lyman W. Graves, Bijou Hills, S. Dak.

Application October 25, 1944, Serial No. 560,226

1 Claim. (Cl. 220—21)

My present invention broadly relates to cases for storing and maintaining batteries, and more particularly, it is my purpose to provide a case for keeping hearing aid batteries. It is customary to purchase a number of A and B batteries for hearing aids at a time, and it has been found desirable to rotate these in use. Such batteries are not all of a standard size so I do not wish to be limited in my present application to size, shape, form and choice of material. I provide a series of suitably numbered compartments to house A and B batteries in a case or container with a suitable top so that the batteries are maintained in proper condition and their sequence of use determined. Simplicity is one of the essential features of my invention, as well as sturdiness and exclusion of deleterious influences and substances such as dust, moisture and the like. The cover is formed with an interior cavity to space the top from the batteries in the compartments.

Other objects and advantages of my invention will be apparent as the description proceeds, but the scope of my invention should only be determined by reference to the appended claim.

In the drawings wherein I have illustrated a preferred form of my invention:

In the drawings wherein like characters of reference are used to designate like or similar parts.

Figure 1:
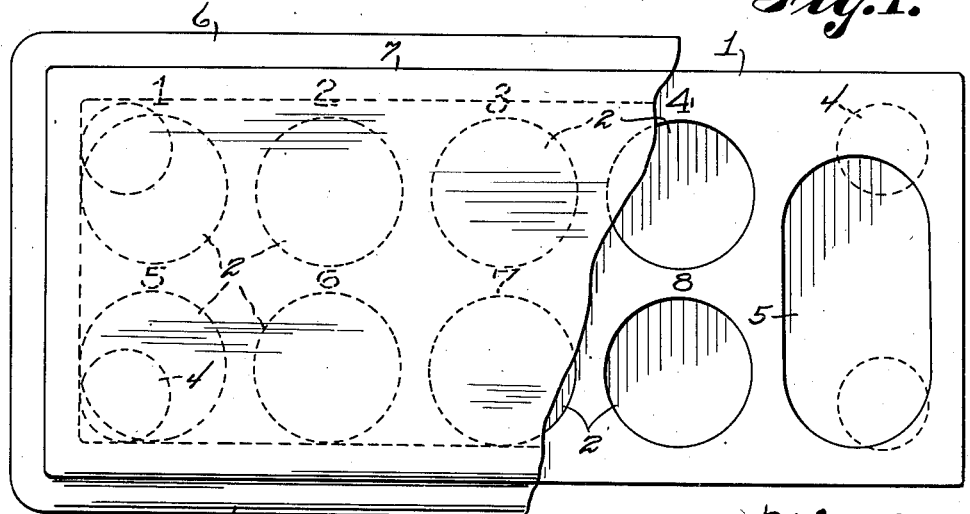
Figure 1 is a top plan view partly broken away.
Figure 2:
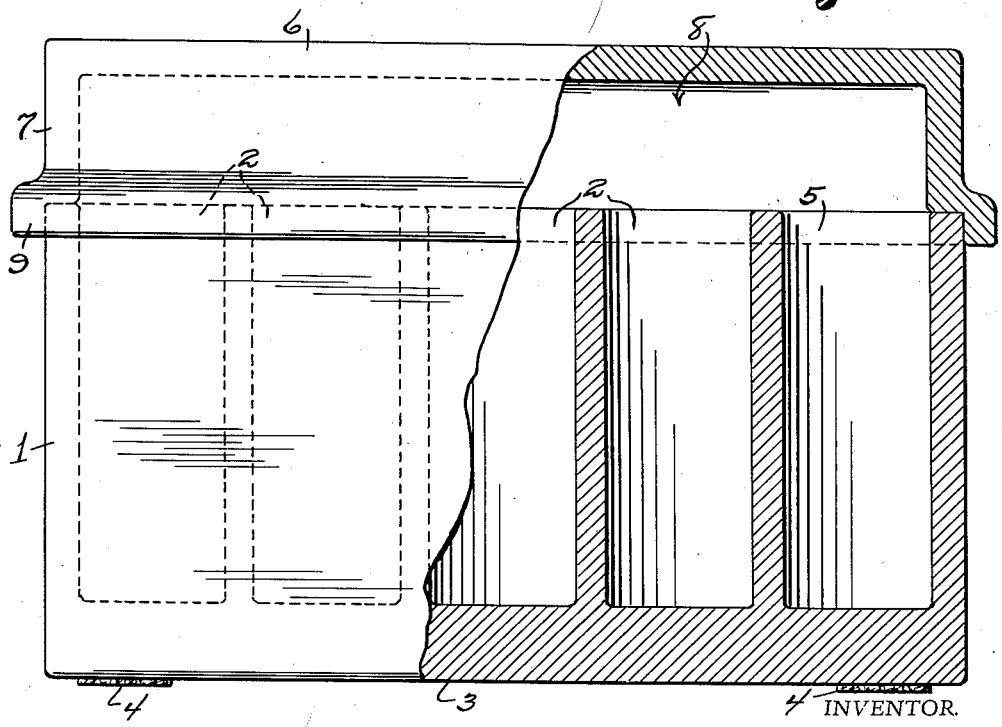
Figure 2 is a side view partly broken away, and in section.

The numeral 1 designates the body of my case which may be formed of plastic, hard rubber or other suitable material and may have handles or the like, if desired, and be suitably decorated or the like. In its present form, the body is rectangular, and a series of four spaced aligned pairs of openings 2 are provided for A batteries or the like. There are eight holes in this form and for this purpose are identified by the numbers 1, 2, 3, 4, 5, 6, 7 and 8. The holes are relatively deep to a point adjacent the bottom 3 of the case. The case may have footing pads 4. At one end of the case is an oblong opening 5 for B batteries, or for two A batteries or the like, and to accommodate the opening 5 the other openings are arranged in series toward one end. The case may be cast or molded as a block with the openings if desired.

The cover 6 is shaped to fit the body and has relatively deep flanges or sides 7 forming a space 8 above the body. Retaining edge flanges 9 fit down over the sides of the body to hold the cover in place.

Batteries in use are placed in the openings or compartments of the body, and selectively used as desired, the identification numerals assisting in distinguishing between the batteries.

While I have described a specific embodiment of my invention, it is to be understood that I am not to be understood as limited thereby in interpretation of my broad inventive concept and the meaning and scope of the appended claim.

I claim:

A container for batteries of hearing aids, comprising a relatively deep body formed with a series of four spaced aligned pairs of circular openings, compartments in said body in alinement with said openings to receive similarly shaped batteries inserted through said openings, an oblong opening formed at one end of the body, a compartment in said body in alinement with said oblong opening to receive a similarly shaped battery inserted through said oblong opening, identification means for each opening printed adjacent its respective opening, a cover for the body formed with relatively deep sides to space the top of the cover from the top of the body, a retaining flange on the lower edge of said cover, a shoulder formed by the flange on the cover adapted for engagement with the upper edges of said body while the lower edges of said flange engage the outer marginal edges of the body adjacent the upper edges thereof, and the body and top being formed in one piece.

LYMAN W. GRAVES.

REFERENCES CITED

The following references are of record in the file of this patent:

UNITED STATES PATENTS

| Number | Name | Date |
|---|---|---|
| 264,096 | McIntosh | Sept. 12, 1882 |
| 890,827 | Vigneron | June 16, 1908 |
| 1,135,580 | Harris | Apr. 13, 1915 |
| 1,186,859 | Stephenson | June 13, 1916 |
| 1,204,172 | McLaughlin | Nov. 7, 1916 |
| 1,393,815 | Nowack | Oct. 18, 1921 |
| 1,635,976 | Percy | July 12, 1927 |
| 1,892,075 | Noffs | Dec. 27, 1932 |
| 2,044,923 | Thompson et al. | June 23, 1936 |

FOREIGN PATENTS

| Number | Country | Date |
|---|---|---|
| 772,884 | France | Aug. 20, 1934 |